Figure 1:
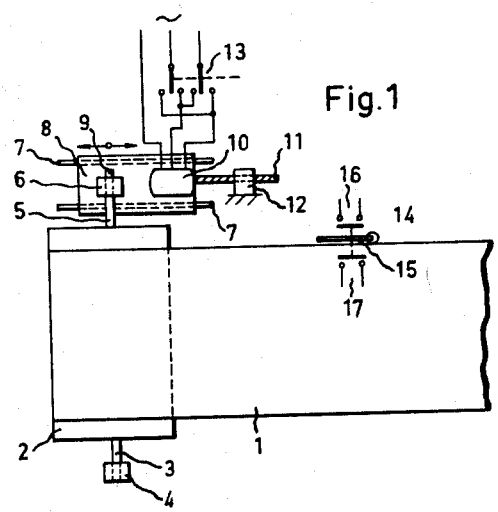

Sept. 29, 1964     C. R. JANSSON     3,150,767
BAND CONVEYOR

Filed Feb. 25, 1963     3 Sheets-Sheet 1

Sept. 29, 1964  C. R. JANSSON  3,150,767
BAND CONVEYOR
Filed Feb. 25, 1963  3 Sheets-Sheet 3
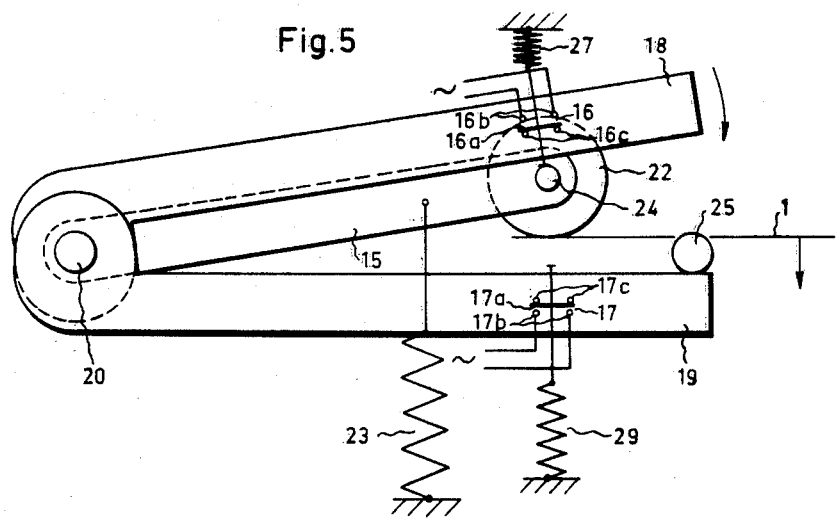

United States Patent Office 3,150,767
Patented Sept. 29, 1964

3,150,767
BAND CONVEYOR
Carl Ragnar Jansson, Solna, Sweden, assignor to Arenco Aktiebolag, Vallingby, Sweden, a joint-stock company of Sweden
Filed Feb. 25, 1963, Ser. No. 260,665
Claims priority, application Sweden, Mar. 2, 1962, 2,340/62
7 Claims. (Cl. 198—202)

The present invention relates to a conveyor comprising an endless conveyor band running over two or several drive or guide rollers. In such band conveyors the moving conveyor band has always a certain tendency to displace itself transversely relatively to the rollers in the axial direction of the rollers. Such a lateral displacement of the conveyor bands can be prevented by making the rollers barrel-shaped, so that the rollers have a larger diameter at their middle portion than at their ends. In many cases, however, this method cannot be used, as it will give cause to a larger tension in the middle portion of the conveyor band than in the edges of the band. Thus, this method cannot be used, e.g., for endless steel conveyor bands used as discharge conveyors in machines for the manufacture of band tobacco. Nor is it possible in such a conveyor, as in certain other cases, to provide the rollers with conical end rings for preventing a lateral displacement of the conveyor band.

It is also known to counteract the tendency of the conveyor band to displace itself transversely relative to the rollers in order to keep the band between predetermined lateral limit positions, by angularly displacing one or several rollers in the plane of the conveyor band from their normal position at right angles to the direction of movement of the band. If e.g. the axis of rotation of a roller lapped by the conveyor band is angularly displaced in one direction from its normal position at right angles to the direction of movement of the band, the band will tend to move transversely in one direction relatively to the roller. If on the other hand the axis of rotation of the roller is angularly displaced in the opposite direction from its normal position, the conveyor band will tend to move transversely in the opposite direction relatively to the roller. In order to counteract the lateral displacement of the conveyor band by this method, so that the band is kept between predetermined lateral limit positions, the angular displacement of the axis of the roller in the plane of the conveyor band must of course be controlled in response to the lateral movement of the conveyor band. For this purpose one can in principle, of course, use a continuously operating regulating system, which displaces the axis of rotation of the roller from its normal position at right angles to the directional movement of the band in proportion to the lateral displacement of the band from its desired lateral zero-position. In practice, however, as e.g. in machines for the manufacture of band tobacco, such a regulating system has proven to be too complicated and too sensitive to disturbances to be usable. Further, the most simple and preferable method of detecting the lateral displacement of the band is to use means responsive to the lateral movement of the edge of the band. The lateral movements of the band edge are, however, not only caused by lateral movement of the entire band relatively to the rollers but are also to a high degree due to the fact that the band is not perfectly straight. Consequently an input control quantity for the regulating system generated by detection of the lateral movement of the band edge will contain a considerable error, which will give cause to serious troubles in a continuously and proportionally operating regulating system of the type suggested above.

A primary object of the present invention is therefore to provide a simple, reliable and stable device, which is insensitive to disturbances, for counteracting the tendency of an endless conveyor band or a similar band running over two or several drive and/or guide rollers to displace itself transversely relatively to the rollers in their axial direction.

With this object in view the invention provides a conveyor comprising an endless band running over two or several rollers, at least one of said rollers being pivotable in the plane of said band about a pivot axis perpendicular to the axis of rotation of said roller, motive means for angularly displacing said roller about said pivot axis in one direction from a normal position for said roller at right angles to the direction of movement of said conveyor band in response to a first control signal and for angularly displacing said roller about said pivot axis in the opposite direction in response to a second control signal, control means for said motive means responsive to transversal movements of said conveyor band relatively to said roller for providing said first control signal, when and only when said conveyor band is moving transversely in one direction away from a predetermined lateral position relatively to said roller, and for providing said second control signal, when and only when said conveyor band is moving transversely in the opposite direction away from said predetermined lateral position.

According to the invention consequently a correction, i.e. an angular displacement of the axis of rotation of the roller in the plane of the conveyor band about an axis perpendicular to the axis of rotation, takes place only when the endless conveyor band is moving transversely in the one or the opposite direction away from its desired lateral zero-position or range of such positions and in such a way that the band is caused to reverse its direction of lateral movement and to return towards the zero-position or the range of such positions. So long as the band is moving in a direction towards the zero-position or the zero-range or is located within this zero-range, no correction whatsoever is made. In this way a very simple and reliable regulating device is achieved, which will ascertain that the band is kept within a zero-range between predetermined lateral limit positions.

Figure 2:
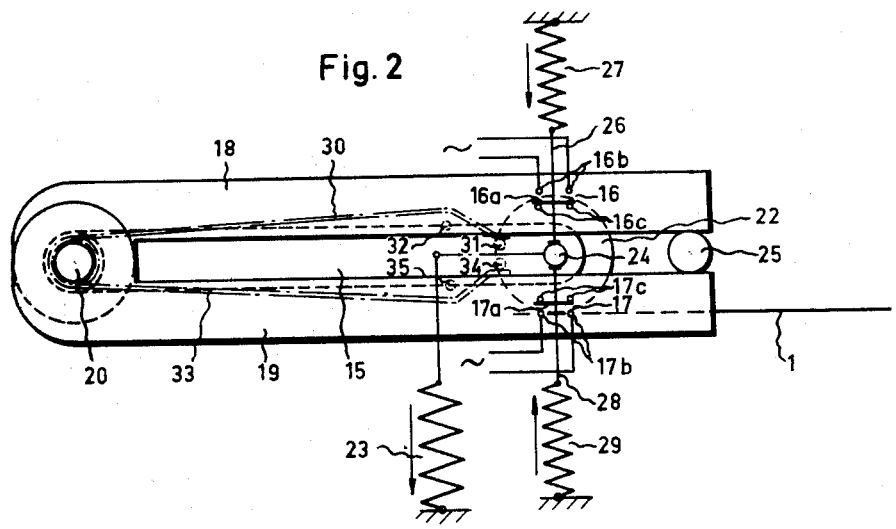
Figure 3:
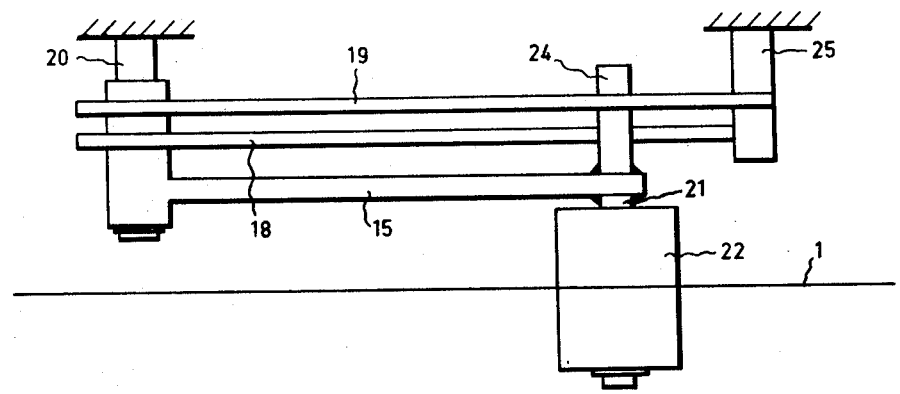
Figure 4:
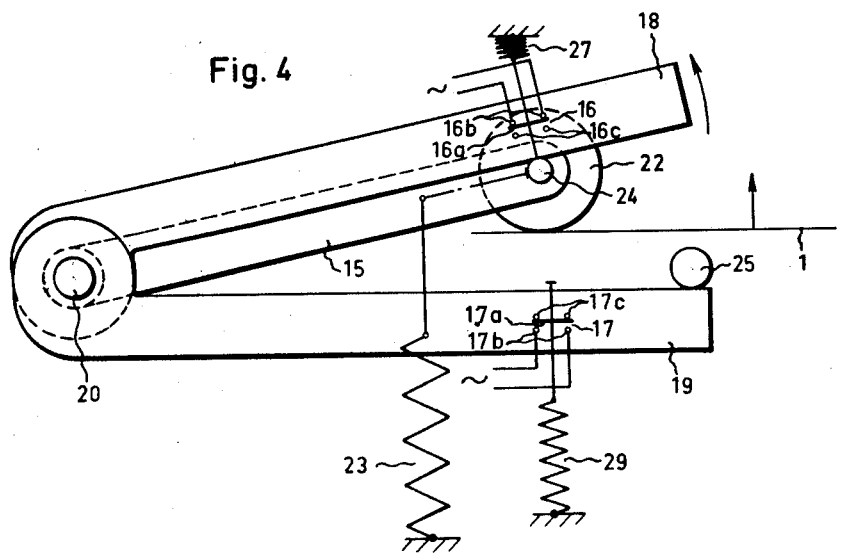

In the following the invention and its mode of operation will be further described with reference to the accompanying drawing, which by way of example shows an embodiment of the invention. In the drawing FIG. 1 shows schematically one end of an endless conveyor band with a guide roller provided with motive means for angularly displacing the axis of rotation of the roller in the plane of the band about an axis perpendicular to the axis of rotation and control means for said motive means. FIG. 2 is a schematic enlarged top view of a control means according to the invention responsive to the lateral movement of the conveyor band, when said control means is in its normal zero-position. FIG. 3 is a side view of said control means with some details omitted for the sake of clarity. FIG. 4 is a top view of the control means shown in FIG. 2, when the conveyor is moving transversely in one direction away from its lateral zero-position. FIG. 5 is a top view of the same control means, when the conveyor band is moving transversely in the opposite direction back towards its zero-position.

FIG. 1 shows one end of an endless conveyor band 1 running over and lapping a guide roller 2. One spindle 3 of the roller is journalled in a bearing 4, which is pivotable about an axis perpendicular to the plane of the drawing. The opposite spindle 5 of the roller is journalled in a bearing 6. This bearing 6 is mounted on a carriage 8, which is movable along guides 7 in the direction of movement of the conveyor band. The bearing 6 is pivotable about an axis perpendicular to the plane of the drawing and is movable along a slot 9 in the carriage 8 in a direction perpendicular to the direction of movement of the conveyor band. An electric motor 10 is mounted on the carriage 8 to drive a screw 11 running through a stationary nut 12. The electric motor 10 can be connected to an alternating current network through a throw-over switch 13 for rotation in the one or the opposite direction. By means of the electric motor 10 and through the cooperation between the screw 11 and the stationary nut 12 the carriage 8 can consequently be displaced along the guides 7 in either direction, so that the guide roller 2 is angularly displaced in the plane of the band in the one or the opposite direction from its normal position at right angles to the direction of movement of the conveyor band.

The throw-over switch 13 is controlled in any suitable conventional way not shown in the drawing, e.g. electromagnetically, from control means, schematically shown and generally indicated by 14 in FIG. 1, which are responsive to a lateral movement of the conveyor band.

These control means are shown in detail in FIGS. 2–5 and comprise substantially a movable lever 15 resting against the edge of the conveyor band 1. When this lever 15 is displaced transversely together with the conveyor band, it will in a manner described below actuate two switching means generally indicated by 16 and 17 respectively. The switching means 16, 17 actuate the throw-over switch 13 for the motor 10 in such a way that, when the switch 16 is closed, the electromotor 10 is connected to the supply network for moving the carriage 8 to the left in FIG. 1, whereby the conveyor band 1 will tend to displace itself downwards in FIG. 1. If on the contrary the switch 17 is closed, the electromotor 10 is connected to the supply network for moving the carriage 8 to the right in FIG. 1, whereby the conveyor band will tend to move upwards in FIG. 1 relatively to the guide roller 2. When both switches 16 and 17 are open, the electromotor 10 and the carriage 8 are not moving.

The embodiment of the control means 14 shown in FIGS. 2–5 consists of three levers 15, 18 and 19, which are individually pivotable about a stationary shaft 20 substantially perpendicular to the plane of the conveyor band 1. The free end of the lever 15 is provided with a roller 22 rotatable around a spindle 21 projecting downwards from the lever. This roller 22 is kept resting against one edge of the conveyor band 1 by means of a spring 23 connected to the lever 15. This end of the lever 15 is also provided with a pin 24 projecting upwards from the arm between the two levers 18 and 19 which are disposed above the lever 15. The angular movements of the levers 18 and 19 are limited in opposite directions by a stationary stop peg 25. The switch 16 is mounted on the lever 18 and consists of a movable contact member 16a and two stationary contact members 16b, which are connected to the control circuit for the throw-over switch 13, and two stationary contact members 16c, which have no connections. The switch 17 is mounted on the lever 19 and consists in a similar way of a movable contact member 17a, two stationary contact members 17b connected to the control circuit for the throw-over switch 13 and two stationary contact members 17c having no connections.

The movable contact member 16a of the switch 16 is permanently attached to a manaeuvre rod 26, one end of which can rest against the pin 24 while its other end is connected to a spring 27. The spring 27 has its opposite end connected to a stationary member and influences the rod 26 in the direction indicated by an arrow. Correspondingly, the movable contact member 17a of the switch 17 is permanently attached to a manaeuvre rod 28, one end of which can rest against the pin 24, while its opposite end is connected to a spring 29. The spring 29 has its opposite end connected to a stationary member and acts upon the rod 28 in the direction indicated by an arrow.

When the conveyor band 1 displaces itself transversely in a direction upwards in the drawings away from its normal zero-position, as shown in FIG. 4, the lever 15 is pivoted about the shaft 20 in counter-clockwise direction. The pin 24 on the lever 15 will then displace the rod 26 and compress the spring 27 and bring the movable contact member 16a of the switch 16 in contact with the stationary contact members 16b, whereby the electromotor 10 is connected to the supply network for rotation in the one direction as previously described. When the movable contact member 16a is in mechanical contact with the stationary contact members 16b and consequently the electromotor 10 has been started, the lever 18 is brought along the angular movement of the lever 15 in counterclockwise direction around the shaft 20, as shown in FIG. 4. So long as the conveyor band continues to move transversely away from its normal zero-position and thus the lever 15 is moved in counter-clockwise direction around the shaft 20, the movable contact member 16a will bridge the stationary contact members 16b in the switch 16 and the electromotor 10 will rotate in the previously mentioned direction and angularly displace the guide roller 2. Meanwhile, the other lever 19 and the switch 17 mounted on this lever will remain unaffected, as the spring 29 keeps the contact member 17a in contact with the stationary contact members 17c, due to which the spring 29 will also keep the lever 19 pressed against the stationary stop peg 25.

Due to the angular displacement of the guide roller 2 brought about in the manner described above, the conveyor band 1 will be caused to reverse its direction of lateral movement to move transversely in the opposite direction back towards its desired zero-position, as shown in FIG. 5. Under the influence of the spring 23 the lever 15 will now pivot in clockwise direction around the shaft 20, as the conveyor band 1 returns to its normal zero-position. When the lever 15 reverses its direction of movement about the axis 20, the spring 27 will at first move the movable contact member 16a in the switch 16 away from the stationary contact members 16b, whereby as previously explained the electromotor 10 is stopped and the angular displacement of the guide roller 2 is interrupted. Meanwhile the lever 18 is not moving, as it is not affected by any external forces and is kept in its position due to the friction present between the lever 18 and the pivot shaft 20. When the angular movement of the lever 15 in clockwise direction about the shaft 20 proceeds, however, the movable contact member 16a in the switch 16 will reach the stationary contact members 16c, whereby the lever 18 will be brought along in the angular movement of the lever 15 towards the zero-position. Consequently, when the conveyor band 1 is moving towards its desired zero-position, the guide roller 2 will remain unaffected. If no further disturbances appear, the conveyor band will consequently proceed in its lateral movement and will pass its zero-position and displace itself transversely in a direction downwards in the drawing away from its zero-position once more, whereby the lever 15 will cooperate with the lever 19 in a manner similar to that described above with respect to the cooperation between the lever 15 and the lever arm 18 and the switch 16.

Although the embodiment of the invention described above has proved to be very advantageous, several other embodiments of the invention and modifications of the embodiment described above are of course possible. Thus e.g. the springs 27 and 29, which in the drawing are schematically shown as coil springs acting upon the manaeuvre rods of the movable contact members in the switches 16, 17, can be replaced by a hairpin spring, as schematically shown in dot-and-dash lines in FIG. 2. This hairpin spring is then permanently mounted on the pivot shaft 20, in such a way that it cannot be rotated about this shaft. The one leg 30 of this spring can with its end cooperate with a peg 31 on the lever 15, so that this leg 30 of the spring is loaded, when the lever 15 is pivoted in counter-clockwise direction about the shaft 20. This leg of the spring can also cooperate with a peg 32 on the lever 18, so that the lever 18 is brought along in clockwise direction due to cooperation between the spring leg 30 and the peg 32, when the lever 15 is pivoted in clockwise direction back to its zero-position. Correspondingly the other leg 33 of the hairpin spring can cooperate with a peg 34 on the lever 15 and another peg 35 on the lever 19. In such an embodiment of the invention the springs 27 and 29 can consequently be omitted and the switches 16 and 17 can consequently consist of normal micro-switches. These switches do not have to include the stationary contact parts 16c and 17c, respectively, as the levers 18 and 19 are brought along with the lever 15 towards the zero-position of the control device by the cooperation between the hairpin spring and the pegs 32 and 35 respectively. It is evident that in such an embodiment of the invention the switches 16, 17 can just as well be mounted on the lever 15. If, however, these switches are mounted on the levers 18 and 19, respectively, as in the embodiment shown in the drawing, the legs 30 and 33 of the hairpin spring may be directly connected with their ends to the movable contact members 16a and 17a respectively in the switches 16 and 17, whereby the legs of the hairpin spring will operate exactly in the same way as the springs 27 and 29 in the illustrated embodiment.

It is also apparent that instead of a single control device, which is actuated, when the conveyor band is on the one side of its normal zero position or as well as when the band is situated on the opposite side of its zero-position, it is also possible to use two control devices, one consisting of the lever 15 and the lever 18 and operating, when the conveyor band is on the one side of its normal zero-position, and a second corresponding control device consisting of a lever similar to the lever 15 and the lever 19 and operating, when the band 1 is displaced to the other side of its zero-position. In a control device of this type it is evident that the arm 15 has to be movable only to the one side of its zero-position, due to which the springs 27 and 29 or any corresponding springs can be omitted, and the pin 24 on the lever 15 can be directly connected to the movable contact member in the associated switch. Also in this case the switch can of course be mounted either on the lever 15 or on the lever 18.

Still other modifications are of course possible within the scope of the invention. According to the invention it is, however, essential that the control device is operative in such a way that the motive means for the angular displacement of the roller is driven in one direction, when the conveyor band moves transversely in one direction away from its zero-position or zero-range, and in the opposite direction, when the conveyor band moves transversely in the opposite direction away from the zero-position or zero range, while the motive means for the angular displacement of the roller are inoperative for all other movements or positions of the conveyor band. The device according to the invention can, of course, also be so designed that more than one roller for the conveyor band is angularly displaced in response to the lateral movement of the band.

I claim:
1. A conveyor comprising conveyor rollers, an endless conveyor band running over said rollers, one of said rollers being pivotable in the plane of said band about a pivot axis perpendicular to the axis of rotation of said roller, reversible motive means for angularly displacing said roller about said pivot axis, a power source for said motive means, first actuable and releasable control means for connecting, when actuated, said motive means to said power source to displace said roller about said pivot axis in one direction and for disconnecting, when released, said motive means from said power source, second actuable and releasable control means for connecting, when actuated, said motive means to said power source to displace said roller about said pivot axis in an opposite direction and for disconnecting, when released, said motive means from said power source, means responsive to lateral deviations of said band relative to said roller from a neutral position for said band for actuating said first control means upon lateral movement of said band in one direction away from said neutral position and for releasing said first control means upon lateral movement of said band towards said neutral position and for actuating said second control means upon lateral movement of said band in the opposite direction away from said neutral position and for releasing said second control means upon lateral movement of said band towards said neutral position.

2. A conveyor as claimed in claim 1, wherein said means responsive to lateral deviations of said band from said neutral position comprises a first member resting against one edge of said band and movable in lateral direction together with said band, a second member movable in lateral direction, stop means for restricting the lateral movement of said second member to one side of said neutral position of said band, means for bringing said second member along with the movement of said first member upon deviation of said band to said one side of said neutral position, said means having a play in one of said first and second members permitting a relative movement between said first and second members before said second member is brought along the movement of said first member, said first control means comprising a first electric switch connecting, when actuated, said motive means to an electric power source to displace said roller in said one direction, and disconnecting, when released, said motive means from said electric power source, said first electric switch being mounted on one of said first and second members so as to be actuated upon a relative movement between said first and second members in one direction and to be released upon a relative movement between said first and second members in the opposite direction.

3. A conveyor as claimed in claim 2, comprising a first spring operated by said first member so as to be tensioned when said first member is moved in said one direction away from said neutral position of the band and engageable with said second member to move said second member towards said neutral position of said band when said first member is moving toward said neutral position.

4. A conveyor as claimed in claim 3, wherein said first electric switch comprises stationary contact members and a movable contact member mechanically cooperating to form said means for bringing said second member along with the movements of said first member.

5. A conveyor as claimed in claim 3, wherein said first electric switch comprises stationary contact members mounted on said second member and a movable contact member attached to said first spring.

6. A conveyor as claimed in claim 2, wherein said means responsive to lateral deviations of said band from said neutral position comprises a third member movable in the lateral direction of said band, stop means for restricting the movement of said third member to the opposite side of said neutral position of said band, means for bringing said third member along with the movements of said first member upon deviation of said band to said opposite side of said neutral position, said means having a play in one of said first and third members permitting a relative movement between said first and said third member before said third member is brought along by the movement of said first member, said second control means comprising a second electric switch connecting, when actuated, said motive means to said electric power source to displace said roller in said opposite direction and disconnecting, when released, said motive means from said electric power source, said second electric switch being mounted on one of said first and third members so as to be actuated upon relative movement between said first and said third members in one direction and to be released upon relative movement between said first and third members in the opposite direction.

7. A conveyor as claimed in claim 6, wherein said first, second and third members are constituted by three arms swingable in planes substantially parallel with the plane of said band about a common axis through one end of said arms, means for keeping the opposite end of the arm constituting said first member in permanent contact with one edge of said conveyor band.

References Cited in the file of this patent
UNITED STATES PATENTS

| | | |
|---|---|---|
| 789,053 | O'Connor | May 2, 1905 |
| 2,075,111 | Gulliksen | Mar. 30, 1937 |
| 2,600,273 | Seifried | June 10, 1952 |